(12) United States Patent
Kale et al.

(10) Patent No.: US 12,277,491 B2
(45) Date of Patent: Apr. 15, 2025

(54) ENCODED HOST TO DLA TRAFFIC

(71) Applicant: Micron Technology, Inc., Boise, ID (US)

(72) Inventors: Poorna Kale, Folsom, CA (US); Saideep Tiku, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 1011 days.

(21) Appl. No.: 17/316,496

(22) Filed: May 10, 2021

(65) Prior Publication Data

US 2022/0358351 A1  Nov. 10, 2022

(51) Int. Cl.
*G06N 3/063*   (2023.01)
*G06F 12/123*  (2016.01)
*G06F 21/14*   (2013.01)
*G06F 21/60*   (2013.01)
*G06F 21/62*   (2013.01)
*G06N 3/04*    (2023.01)
*G06N 3/045*   (2023.01)
*G06N 3/0455*  (2023.01)
*G06N 3/08*    (2023.01)
*G11C 16/08*   (2006.01)

(52) U.S. Cl.
CPC ........... *G06N 3/063* (2013.01); *G06F 12/125* (2013.01); *G06F 21/14* (2013.01); *G06F 21/6218* (2013.01); *G06N 3/04* (2013.01); *G06N 3/045* (2023.01); *G06N 3/0455* (2023.01); *G06N 3/08* (2013.01); *G11C 16/08* (2013.01); *G06F 21/606* (2013.01)

(58) Field of Classification Search
CPC ........ G06N 20/00; G06N 20/10; G06N 20/20; G06N 3/02; G06N 3/04; G06N 3/045; G06N 3/0455; G06N 3/063; G06N 3/08; G06F 12/125; G06F 21/14; G06F 21/606; G06F 21/6218; G11C 16/08
See application file for complete search history.

(56) References Cited

U.S. PATENT DOCUMENTS

| | | | |
|---|---|---|---|
| 7,916,956 | B1 | 3/2011 | Hobbs et al. |
| 8,831,003 | B2 | 9/2014 | Guo et al. |
| 10,243,980 | B2 | 3/2019 | Vasseur et al. |
| 2020/0250545 | A1 | 8/2020 | Verrilli et al. |
| 2020/0361083 | A1* | 11/2020 | Mousavian ............ G06N 3/063 |
| 2022/0055689 | A1* | 2/2022 | Mandlekar ........ B60W 60/0025 |

* cited by examiner

*Primary Examiner* — Shane D Woolwine
(74) *Attorney, Agent, or Firm* — Brooks, Cameron & Huebsch, PLLC

(57) ABSTRACT

Apparatuses and methods can be related to encoding traffic between a host and a deep learning accelerator (DLA). Traffic between a host can be encoded utilizing an autoencoder. Encoding traffic between a host and a DLA changes the bandwidth of the traffic. Changing the bandwidth of the traffic prevents the correlation between the bandwidth and the input from which the traffic is generated.

23 Claims, 7 Drawing Sheets

ENCODED HOST TO DLA TRAFFIC

TECHNICAL FIELD

The present disclosure relates generally to memory, and more particularly to apparatuses and methods associated with encoding traffic between a host and a deep learning accelerator (DLA).

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

Figure 1:
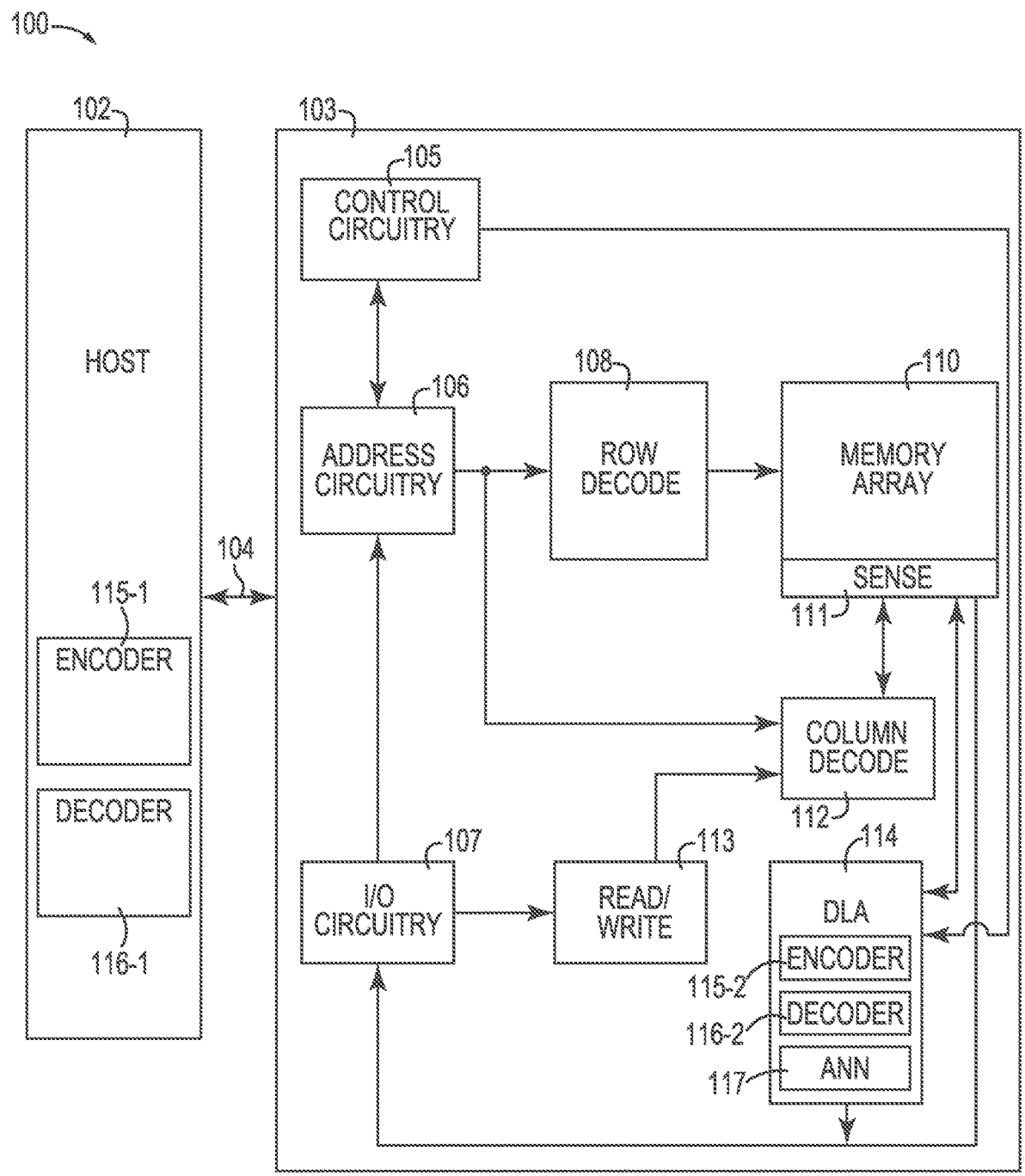
FIG. 1 is a block diagram of an apparatus in the form of a computing system including a memory device in accordance with a number of embodiments of the present disclosure.

The present disclosure includes apparatuses and methods related to encoding traffic between a host and a deep learning accelerator (DLA). A DLA can be implemented in a memory device.

As used herein, an artificial neural network (ANN) can provide learning by forming probability weight associations between an input and an output. The probability weight associations can be provided by a plurality of nodes that comprise the ANN. The nodes together with weights, biases, and activation functions can be used to generate an output of the ANN based on the input to the ANN. A plurality of nodes of the ANN can be grouped to form layers of the ANN.

Inexpensive and energy-efficient artificial intelligence (AI) accelerators such as deep learning accelerators (DLAs) can be implemented on the edge of a memory device and are referred to herein as "DLAs" or "edge DLAs." As used herein, an edge of a memory device can refer to an area of the memory device other than an area of the memory device occupied by the memory array and/or the sensing circuitry. For example, an edge of the memory device can refer to an output and/or input path of a memory device, where the output path and/or the input path is used to store and/or read data from a memory array of the memory device.

As used herein, AI refers to the ability to improve an apparatus through "learning" such as by storing patterns and/or examples which can be utilized to take actions at a later time. Deep learning refers to a device's ability to learn from data provided as examples. Deep learning can be a subset of AI. Neural networks, among other types of networks, can be classified as deep learning. The low power and inexpensive design of DLAs can be implemented in internet-of-things (IOT) devices or memory devices, among other types of devices. The edge DLAs can process and make intelligent decisions at run-time. Memory devices including the edge DLAs can also be deployed in remote locations without cloud or offloading capability.

A DLA implemented in a memory device can receive signals from a host and can cause signals to be transmitted to the host, where the host is coupled to the memory device via an interface. However, the signals transmitted between the DLA and the host may be observed by a third party. As used herein, signals transmitted between the DLA and the host can be referred to as traffic. The signals can include data files and commands, among other types of traffic that can be communicated between the host and the DLA.

Safety-critical applications such as applications utilized in self-driving cars are a target for side channel attacks. As used herein, side channel attacks exploit vulnerabilities to extract otherwise unavailable privileged data from memory devices. For example, privileged data, in the context of applications utilized in self-driving cars, can include a number of nearby vehicles, current road scene (e.g., images), and the position of various objects in the vicinity of a vehicle, among other examples of privileged data.

Privileged data can be correlated to resource utilization. For example, privileged data can be correlated to bandwidth of node interconnects. As used herein, node interconnects describe how nodes are connected to different nodes. For examples, node interconnects can describe how nodes of a layer are connected to nodes of a different layer.

In various instances, the bandwidth utilization of a bus, such as a PCIe bus, that connects a DLA to host (e.g., host processor) can be dependent on the data that is moved across the bus. When performing operations on a DLA, the data (e.g., signals) sent over the bus can be correlated to the input data provided to the DLA. The relationship between bandwidth utilization and the input data can be utilized by a secondary model to predict input data characteristics and/or to predict the output provided by the DLA. As such, the input data, the bandwidth utilization, and the output data, can be privileged data.

Privileged data can be utilized to influence self-driving software's autonomous decisions opportunistically, for example. To overcome safety concerns of side channel attacks, the information available and/or visible to an observer may be limited.

Aspects of the present disclosure address the above and other deficiencies. Deep learning-based encoding and/or obfuscation of input data can be provided over an interface connecting a DLA and host to overcome the above deficiencies. The deep learning-based encoding and/or obfuscation can be performed in real-time. The compression resultant from encoding and/or obfuscating can have an effect on the traffic provided over an interface coupling the memory device to the host. As used herein, obfuscation can describe the altering traffic to change the size of traffic between a host and a memory device. For example, obfuscation can add bits to the traffic. Altering the traffic provided over the interface can refute attempts to identify the input data and/or the output data from the interface traffic. Given the power consumption and latency issue involved with encoding and/or obfuscating interface traffic, the level of encoding and/or obfuscating can be configured.

The figures herein follow a numbering convention in which the first digit or digits correspond to the drawing figure number and the remaining digits identify an element or component in the drawing. Similar elements or components between different figures may be identified by the use of similar digits. For example, 115-1 may reference element "15" in FIG. 1, and a similar element may be referenced as 215-1 in FIG. 2. Analogous elements within a Figure may be referenced with a hyphen and extra numeral or letter. See, for example, elements 115-1, 115-2 in FIG. 1. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a computing system 100 including a memory device 103 in accordance with a number of embodiments of the present disclosure. As used herein, a memory device 103, memory array 110, and/or a host 102, for example, might also be separately considered an "apparatus."

In this example, the computing system 100 includes a host 102 coupled to memory device 103 via an interface 104. The computing system 100 can be a personal laptop computer, a desktop computer, a digital camera, a mobile telephone, a memory card reader, or an Internet-of-Things (IoT) enabled device, among various other types of systems. The host 102 can include a number of processing resources (e.g., one or more processors, microprocessors, or some other type of controlling circuitry), referred to as processors 116, capable of accessing the memory device 103. The computing system 100 can include separate integrated circuits, or both the host 102 and the memory device 103 can be on the same integrated circuit. For example, the host 102 may be a system controller of a memory system comprising multiple memory devices 103, with the system controller providing access to the respective memory devices 103 by another processing resource such as a central processing unit (CPU).

In the example shown in FIG. 1, the host 102 is responsible for executing an operating system (OS) and/or various applications that can be loaded thereto (e.g., from memory device 103 via control circuitry 105). The OS and/or various applications can be loaded from the memory device 103 by providing access commands from the host 102 to the memory device 103 to access the data comprising the OS and/or the various applications. The host 102 can also access data utilized by the OS and/or various applications by providing access commands to the memory device 103 to retrieve said data utilized in the execution of the OS and/or the various applications.

For clarity, the computing system 100 has been simplified to focus on features with particular relevance to the present disclosure. The memory array 110 can be a DRAM array, SRAM array, STT RAM array, PCRAM array, TRAM array, RRAM array, NAND flash array, NOR flash array, and/or 3D Cross-point array for instance. The memory array 110 can comprise memory cells arranged in rows coupled by access lines (which may be referred to herein as word lines or select lines) and columns coupled by sense lines (which may be referred to herein as digit lines or data lines). Although the memory array 110 is shown as a single memory array, the memory array 110 can represent a plurality of memory arrays arraigned in banks of the memory device 103.

The memory device 103 includes address circuitry 106 to latch address signals provided over an interface 104. The interface can include, for example, a physical interface (e.g., a data bus, an address bus, and a command bus, or a combined data/address/command bus) employing a suitable protocol. Such protocol may be custom or proprietary, or the interface 104 may employ a standardized protocol, such as Peripheral Component Interconnect Express (PCIe), Gen-Z interconnect, cache coherent interconnect for accelerators (CCIX), or the like. Address signals are received and decoded by a row decoder 108 and a column decoder 112 to access the memory arrays 110. Data can be read from memory arrays 110 by sensing voltage and/or current changes on the sense lines using sensing circuitry 111. The sensing circuitry 111 can be coupled to the memory arrays 110. Each memory array and corresponding sensing circuitry can constitute a bank of the memory device 103. The sensing circuitry 111 can comprise, for example, sense amplifiers that can read and latch a page (e.g., row) of data from the memory array 110. The I/O circuitry 107 can be used for bi-directional data communication with the host 102 over the interface 104. The read/write circuitry 113 is used to write data to the memory arrays 110 or read data from the memory arrays 110. As an example, the read/write circuitry 113 can comprise various drivers, latch circuitry, etc.

Control circuitry 105 decodes signals provided by the host 102. The signals can be commands provided by the host 102. These signals can include chip enable signals, write enable signals, and address latch signals that are used to control operations performed on the memory array 110, including data read operations, data write operations, and data erase operations. In various embodiments, the control circuitry 105 is responsible for executing instructions from the host 102. The control circuitry 105 can comprise a state machine, a sequencer, and/or some other type of control circuitry, which may be implemented in the form of hardware, firmware, or software, or any combination of the three. In some examples, the host 102 can be a controller external to the memory device 103. For example, the host 102 can be a memory controller which is coupled to a processing resource of a computing device. Data can be provided to the memory array 110 and/or from the memory array via the data lines coupling the memory array 110 to the I/O circuitry 107.

The memory device (e.g., memory sub-system) can also comprise a DLA 114. The DLA can be implemented on an edge of the memory device. For example, the DLA 114 can be implemented external to the memory array 110. The DLA 114 can be coupled to an output path that couples the memory array 110 to the I/O circuitry 107.

The DLA 114 can also be coupled to the control circuitry 105. The control circuitry 105 can control the DLA 114. For example, the control circuitry 105 can provide signaling to the row decoder 108 and the column decoder 112 to cause the transferring of data from the memory array 110 to the DLA 114 to provide an input to the DLA 114. The control circuitry 105 can also cause the output of the DLA 114 to be provided to the I/O circuitry 107 and/or be stored back to the memory array 110.

The host 102 can host an encoder 115-1 and/or a decoder 116-1. The DLA 114 can host an encoder 115-2, a decoder 116-2, and an ANN 117. The DLA 114 can be controlled by the control circuitry 105 to execute the ANN 117, the encoder 115-2, and/or the decoder 116-2.

As used herein, the encoders 115-1, 115-2 and the decoders 116-1, 116-2 comprise hardware and/or firmware to implement an ANN that is utilized to encode or decode an input, respectively. The encoder 115-1 and the decoder 116-2 can comprise a first autoencoder. The encoder 115-2 and the decoder 116-1 can comprise a second autoencoder. The first autoencoder can be utilized to encode and decode traffic provided from the host 102 and to the DLA 114. The second autoencoder can be utilized to encode and decode traffic provided from the DLA 114 and to the host 102. The ANN 117 can comprise hardware and/or firmware to implement an ANN for performing operations on decoded data.

As used herein, decoding or encoding describes the process of converting data from one format to a different format. The terms decoding and encoding, as used herein, are utilized in the context of cryptography such that data can be encoded from a plain format into an encoded format and encoded data can decoded from an encoded format to a plain format. A plain format describes a format in which the data was generated or prepared for processing.

In various examples, the host 102 can access data. The data can be generated by a plurality of sensors of a vehicle, for example. For instance, a camera of a vehicle can generate a plurality of images. The host 102 can encode the data utilizing the encoder 115-1. The encoder 115-1 can generate the encoded data. The encoded data can be provided to the memory device 103 via the interface 104. The memory device 103 can provide the encoded data to the DLA 114.

The DLA 114 can decode the encoded data utilizing the decoder 116-2. The decoder 116-2 can generate the decoded data. In various instances, the data and the decoded data can be similar but not identical. The decoded data can retain many of the essential features of the data but may have a different size than the data. For example, the decoded data may be smaller than the data.

The DLA 114 can provide the decoded data to the ANN 117. The ANN 117 can, for example, process the decoded data to generate an output. The output can be a classification in the case of an image for example. The ANN 117 can perform operations on the decoded data that are requested by the host 102. As used herein, performing operations in the context of the ANN 117 can include propagating the decoded data through a plurality of nodes to generate an output.

The output generated by the ANN 117 can be provided to the encoder 115-2 to generate an encoded output. The encoded output can be provided to the host 102 via the interface 104. In various instances, the output generated by the ANN 117 can be provided directly to the host 102 without being encoded.

The host 102 can decode the encoded output utilizing the decoder 116-1 to generate a decoded output. In various instances, the host 102 can utilize the decoded output to perform further operations.

In various instances, the DLA 114 can cause the encoded output or the output to be stored in the memory array 110. The host 102 can retrieve the encoded output or the output from the memory array 119.

In a number of examples, the host 102 can configure the DLA 114, the encoder 115-2, the decoder 116-2, and/or the ANN 117. For example, the host 102 can provide a plurality of hyperparameters to the memory device 103 to configure the DLA 114 including the encoder 115-2, the decoder 116-2, and/or the ANN 117. The hyperparameters can include, a quantity of layers, a quantity of nodes, a quantity of nodes per layer, a plurality of weights, a plurality of biases, and/or an activation function, among other possible parameters that can be utilized to configure an ANN.

The host 102 can encode the hyperparameters prior to providing the hyperparameters to the DLA 114. In other examples, the host 102 may provide the hyperparameters, without encoding the hyperparameters, to the DLA 114. If encoding the hyperparameters, the host 102 can utilize the encoder 115-1 to generate encoded hyperparameters. The host 102 can provide the encoded hyperparameters to the DLA 114. The DLA 114 can decode the encoded hyperparameters utilizing the decoder 116-2. The decoder 116-2 can utilize default hyperparameters to decode the encoded hyperparameters. The decoder 116-2 can generate decoded hyperparameters. The DLA 114 can configure the decoder 116-2, the encoder 115-2, and/or the ANN 117 utilizing the decoded hyperparameters.

Providing the host 102 with the ability to configure the encoder 115-2 and/or the decoder 116-2 provides for a unique key to be used. The key used to encode or decode interface traffic can be the hyperparameters themselves or can be based on the hyperparameters utilized to configure the encoders 115-1, 115-2 and the decoder 116-1, 116-2.

Although the examples shown in FIG. 1 provide the encoder 115-2 and the decoder 116-2 as being implemented in the DLA 114, the encoder 115-2 and the decoder 116-2 can be implemented in a different portion of the memory device 103. For instance, the encoder 115-2 and the decoder 116-2 can be implemented in the control circuitry 105 and/or the I/O circuitry 107, among other locations within the memory device 103.

The examples described herein provide for the DLA 114 to perform a plurality of actions such as decoding data utilizing the decoder 116-2. Any actions described as being performed by the DLA 114 can in fact be performed by the control circuitry 105. For example, the control circuitry 105 can receive commands from the host 102 to decode the encoded data received via the interface 104. The control circuitry 105 can control the DLA 114 to cause the DLA 114 to decode encoded data utilizing the decoder 116-2.

In various instances, the host 102 can provide commands along with the encoded data to cause the encoded data to be decoded. The host 102 can also provide commands along with the encoded hyperparameters to cause the DLA 114 to decode the hyperparameters. The host 102 can further provide commands to cause the DLA 114 to perform operations utilizing the ANN 117 and the decoded data. The host 102 can further provide commands to cause the DLA 114 to utilize the hyperparameters to configure the encoder 115-2, the decoder 116-2, and/or the ANN 117.

Figure 2:
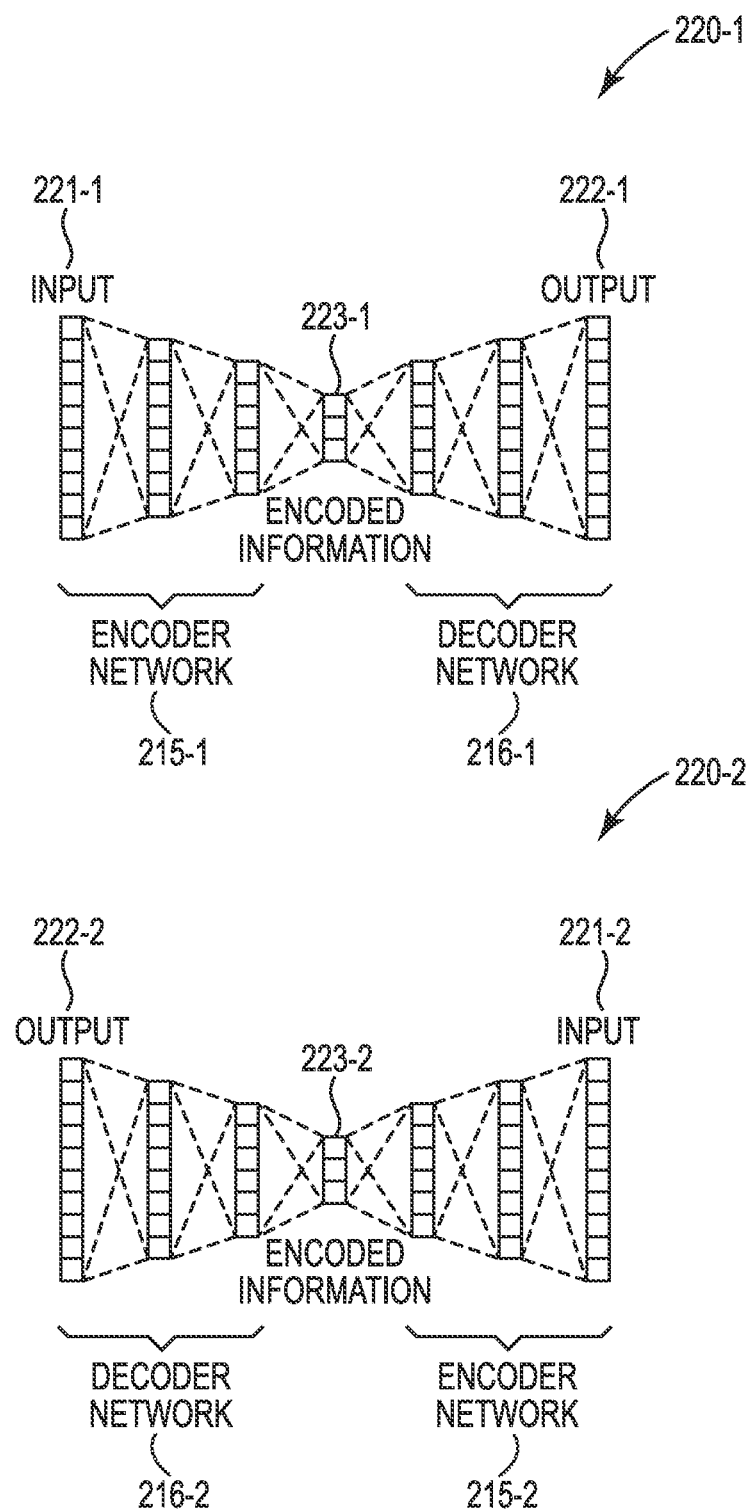
FIG. 2 illustrates a block diagram of autoencoders in accordance with a number of embodiments of the present disclosure.

FIG. 2 illustrates a block diagram of autoencoders 220-1, 220-2 in accordance with a number of embodiments of the present disclosure. FIG. 2 shows the autoencoders 220-1, 220-2 as neural networks. As used herein, the autoencoders 220-1, 220-2 are referred to herein as autoencoders 220. The autoencoder 220-1 includes an encoder network 215-1 and a decoder network 216-1. An input can be provided to the encoder network 215-1. The encoder network 215-1 can generate encoded data 223-1 (e.g., encoded information). The decoder network 216-1 can receive the encoded data 223-1 and can generate an output 222-1. The autoencoder 220-2 can receive an input 221-2. The autoencoder 220-2 can comprise a decoder network 216-2, encoded data 223-2 (e.g., encoded information), and an encoder network 215-2. The autoencoder 220-2 can generate an output 222-2.

As used herein, the encoder networks 215-1, 215-2 can be referred to as encoders 215-1, 215-2, respectively. The decoder networks 216-1, 216-2 can be referred to as decoders 216-1, 216-2, respectively. The encoder networks 215-1, 215-2 and the decoder networks 216-1, 216-2 can be comprised of artificial neural networks such that the autoencoders 220-1, 220-2 are comprised of artificial neural networks. As used herein, the autoencoders 220-1, 220-2 are comprised of a plurality of layers. Each of the plurality of layers are comprised of a plurality of nodes. The nodes of each of the layers are coupled to other nodes of other layers. Each of the autoencoders 220-1, 220-2 can be implemented by a host and a memory device. For example, the encoder network 215-1 of the autoencoder 220-1 can be implemented by a host. The decoder network 216-1 of the autoencoder 220-1 can be implemented by the memory device.

The encoder network 215-2 of the autoencoder 221-2 can be implemented by the memory device. The decoder network 216-2 of the autoencoder 221-2 can be implemented by the memory device. The decoder network 216-1 and the encoder network 215-2 can be implemented by the DLA 114 of FIG. 1.

The host can access the input 221-1. The host can provide the input 221-1 to the encoder network 215-1. The input 221-1 can be referred as a data. The host can implement the encoder network 215-1 by executing a plurality of computer executable instructions (e.g., software) that represent the encoder network 215-1. The host can utilize the plurality of computer executable instructions to process the input 221-1. The encoder network 215-1 can generate an output. The output can be the encoded data 223-1. As such, the output of the encoder network 215-1 can be referred to as an encoded output.

The encoded data 223-1 can be transmitted via an interface coupling the host to the memory device. The memory device can receive the encoded data 223-1. The encoded data 223-1 can be provided to the DLA. The encoded data 223-1 can be processed by the decoder network 216-1. The decoder network 216-1 can be implemented as firmware. The decoder network 216-1 can decode the encoded data 223-1 to generate the output 222-1. The output 222-1 can be referred to as decoded data.

The data comprising the input 221-1 and the decoded data comprising the output 222-1 can be substantially similar but may not be the same. For example, the decoded data may be smaller in size than the data. The size difference between the decoded data and the data can be a result of the encoding and decoding process where encoding and decoding results in the loss of information. The loss of information can be made manifest in the size of the decoded data. The decoded data can retain many of the features of the data. The encoder network 215-1 and the decoder network 216-1 can be configured to cause the decoded data to retain the features of the data that are desired.

In various instances, the hyperparameters of the encoder network 215-1 can be considered a first key and the hyperparameters of the decoder network 216-1 can be considered a second key. The configuring of the encoder network 215-1 and the decoder network 216-1 can be performed utilizing different hyperparameters such that different keys can be utilized to encode and decode the input 221-1 and the encoded data 223-1. In various instances, the hyperparameters of the encoder network 215-1 and the decoder network 216-1 can be the same such that the encoder network 215-1 and the decoder network 216-1 share a key.

The memory device can process the output 222-1. For example, the DLA can provide the output 222-1 as an input to an ANN that is separate from the decoder network 216-1 and the encoder network 215-2. The output from the ANN can be provided as an input 221-2 to the encoder network 215-2. The encoder network 215-2, implemented in the DLA of the memory array, can process the input 221-2 to generate the encoded data 223-2. The encoded data 223-2 can be provided to the host via the interface coupling the host to the memory device. The host can receive the encoded data 223-2. The host can decode the encoded data 223-2 utilizing the decoder network 216-2. The decoder network 216-2 can generate the output 222-2 from the encoded data 223-2. The output 222-2 can be decoded data.

In various instances, the memory device can cause the encoded data 223-2 to be stored in the memory array. The host can retrieve the encoded data 223-2 from the memory array by causing the encoded data 223-2 to be retrieved via the interface coupling the host to the memory device. The host can decode the encoded data 223-2 as previously described.

The memory device can also cause the output of the ANN (e.g., input 221-2) to be stored in the memory. The host can retrieve the output of the ANN from the memory array by causing the output of the ANN to be retrieved via the interface coupling the host to the memory device. The host can utilize the output of the ANN without decoding the output of the ANN.

Figure 3A:
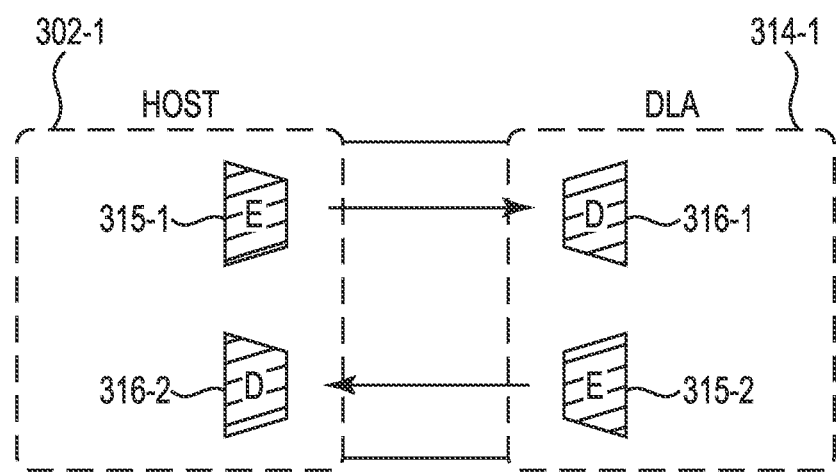
FIG. 3A illustrates a block diagram of traffic between a host and a DLA in accordance with a number of embodiments of the present disclosure.

FIG. 3A illustrates a block diagram of traffic between a host 302-1 and a DLA 314-1 in accordance with a number of embodiments of the present disclosure. The host 302-1 and the DLA 314-1 provide a first example of encoding and decoding data.

The host 302-1 and the DLA 314-1 show symmetric encoding and decoding. As used herein, symmetric encoding describes the use of a same key for encoding and decoding traffic between the host 302-1 and the DLA 314-1. The use of the same key is shown by the shading of the encoder 315-1 and the decoder 316-1. The encoder 315-1 and the decoder 316-1 show a same shading to show that the encoder 315-1 and the decoder 316-1 share a same key for encoding and decoding.

The keys used to encode and decode can be comprised of weights, biases and/or activation functions, among other hyperparameters of the encoder 315-1 and the decoder 316-1.

Although the keys of the encoder 315-1 and the decoder 316-1 are described as being a same key, the implementation of the keys may be different. For example, the weights of a first layer of the encoder 315-1 which can comprise the key of the encoder 315-1 may be different than the weights of the first layer of the decoder 316-1 which can comprise the key of the decoder 315-1. However, the weights of the first layer of the encoder 315-1 may be the same as the weights of a last layer of the decoder 316-1 while the weights of the last layer of the encoder 315-1 can be the same as the weights of the first layer of the decoder 316-1.

The keys used by the encoder 315-1 and the decoder 316-1 can be the same keys utilized by the encoder 315-2 and the decoder 316-2. For example, the key utilized by the encoder 315-1 can be a same key utilized by the encoder 315-2. The key utilized by the decoder 316-1 can be a same key utilized by the decoder 316-2. The use of the same keys in the encoders 315-1, 315-2 and the decoders 316-1, 316-2 provide for asymmetric encoding/decoding between the autoencoder that includes the encoder 315-1 and the decoder 316-1 and the autoencoder that includes the encoder 315-2 and the decoder 316-2.

The host 302-1 can configured the encoders 315-1, 315-2 and the decoders 316-1, 316-2 as symmetric by programming the encoders 315-1, 315-2 and the decoders 316-1, 316-2 with the same hyperparameters that comprise a same key.

Figure 3B:
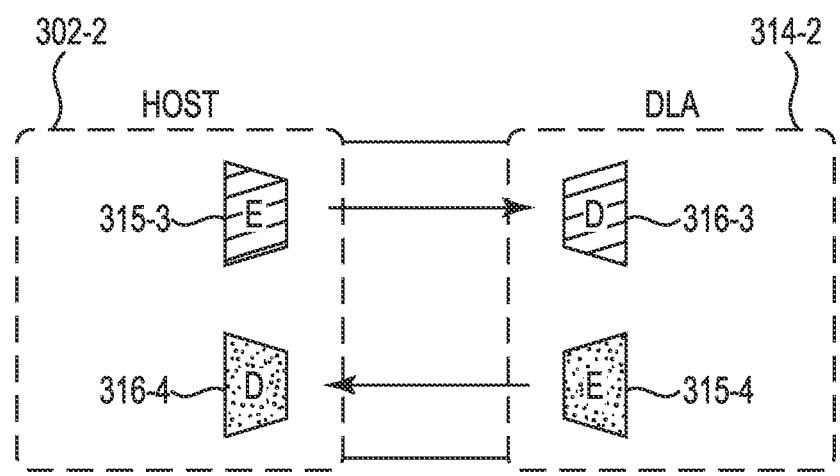
FIG. 3B illustrates a block diagram of traffic between a host and a DLA in accordance with a number of embodiments of the present disclosure.

FIG. 3B illustrates a block diagram of traffic between a host 302-2 and a DLA 314-2 in accordance with a number of embodiments of the present disclosure. The host 302-2 and the DLA 314-2 provide a second example of encoding and decoding data.

The host 302-2 and the DLA 314-2 show asymmetric encoding and decoding. As used herein, symmetric encoding describes the use of different keys for encoding and decoding traffic between the host 302-2 and the DLA 314-2. The encoder 315-3 and the decoder 316-3 show a same shading to show that the encoder 315-3 and the decoder 316-3 share a same key for encoding and decoding. The encoder 315-4 and the decoder 316-4 show a different shading as the shading used for the encoder 315-3 and the decoder 316-3 but a same shading as each other to show that different keys are used for the encoders 315-3, 315-4 and the decoders 316-3, 316-4. The keys used to encode and decode can be comprised of weights, biases and/or activation functions, among other hyperparameters of the encoders 315-3, 315-4 and the decoder 316-3, 316-4.

Figure 4:
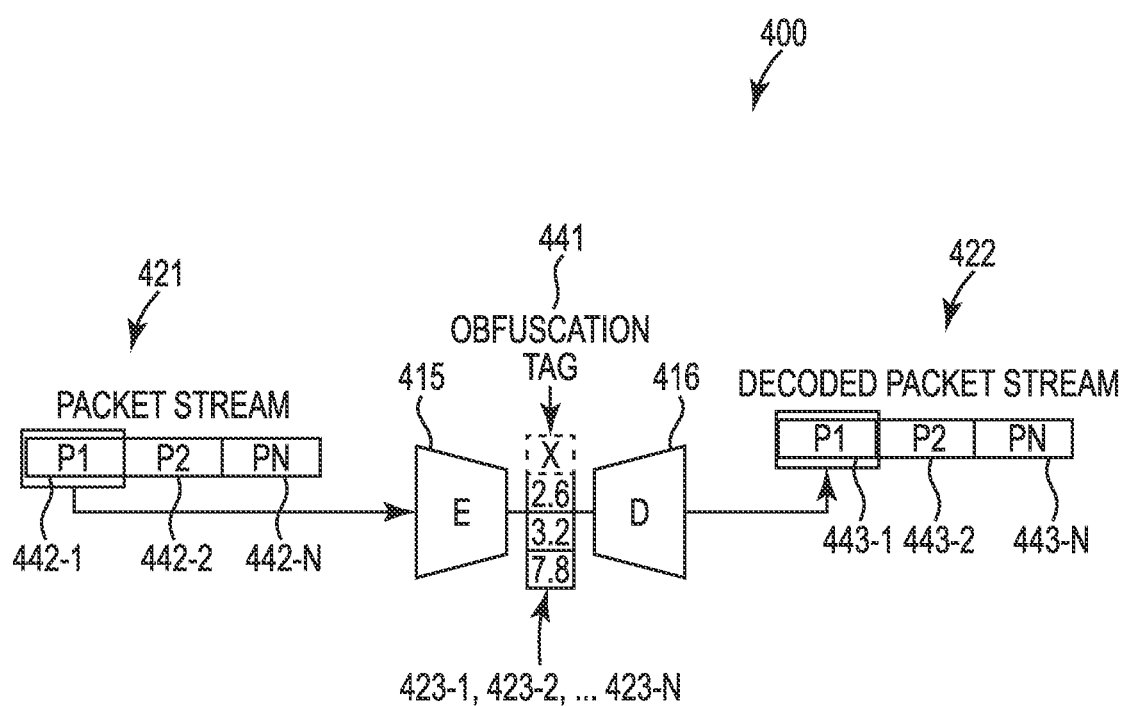
FIG. 4 illustrates a block diagram of traffic between a host and a DLA in accordance with a number of embodiments of the present disclosure.

The host 302-2 can configured the encoders 315-3, 315-4 and the decoders 316-3, 316-4 as asymmetric by programming the encoders 315-3, 315-4 and the decoders 316-3, 316-4 with different hyperparameters that comprise FIG. 4 illustrates a block diagram of traffic between a host and a DLA in accordance with a number of embodiments of the present disclosure. In various examples, the input 421 can be processed such that the input is a packet stream comprising packets 442-1, 442-2, ..., 442-N, referred to generally as packets 442.

Each of the packets 442 can be encoded by the encoder 415. For example, the encoder 415 of an autoencoder can encode the packet 442-1 to generate the encoded packet 423-1, the packet 442-2 to generate the encoded packet 423-2, ..., the packet 443-N to generate the encoded packet 423-N. The encoded packets 423-1, 423-2, ..., 423-N can be referred to as encoded packets 423. The encoded packets can be provided via an interface. The encoded packets 423 can be decoded 416 by a decoder of the autoencoder. For example, the decoder can decoder the encoded packet 423-1 to generate the decoded packet 443-1, the encoded packet 423-2 to generate the decoded packet 443-2, ..., and the encoded packet 423-N to generate the decoded packet 443-N.

In various instances, the host and/or the memory device may insert obfuscation tags 441 into the encoded packets 423. For example, the autoencoder can insert the obfuscation tags 441. The host can configure the decoder 416 to remove the obfuscation tags 441 from the encoded packets 423 prior to decoding the encoded packets 423. In various examples, the scheme for inserting the obfuscation tags 441 may be known to the host and the memory device such that the obfuscation tags 441 may alter the size of the traffic between a host and the memory device without altering the size of the decoded packets 443. The host can configure the encoder 415 and/or the decoder 416 to recognize the obfuscation tag 441 or a placement of the obfuscation tag 441 within the order of encoded packets 423.

Figure 5:
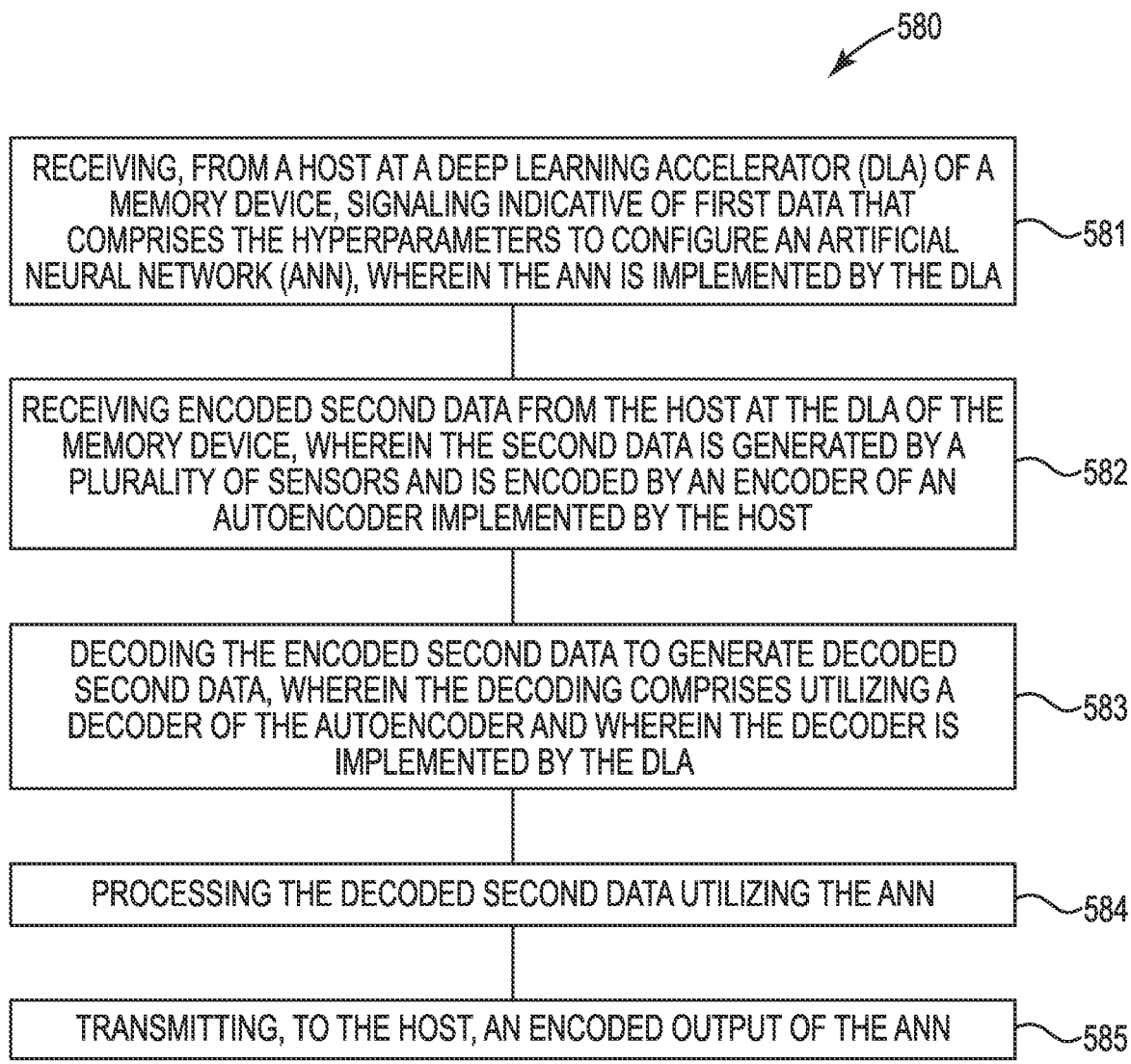
FIG. 5 illustrates an example flow diagram of a method for encoding traffic between a host and a DLA in accordance with a number of embodiments of the present disclosure.

FIG. 5 illustrates an example flow diagram of a method 580 for compiling instructions to implement bypass paths in an artificial neural network in accordance with a number of embodiments of the present disclosure. The method 580 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 580 is performed by the control circuitry (e.g., controller) 105, by the host 102, and/or by the DLA 114 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 581, signaling indicative of first data that comprises hyperparameters can be received from a host at a DLA of a memory device to configure an ANN, where the ANN is implemented by the DLA. The hyperparameters for the ANN can be accessed. For example, the hyperparameters can be retrieved from a memory array or can be received from a different device. The hyperparameters can be provided from the host and to the DLA of a memory device to configure an ANN.

At block 582, encoded second data can be received from the host at the DLA of the memory device. The second data can be generated by a plurality of sensors. The second data can be encoded by an encoder of an autoencoder implemented by the host. The second data, generated by a plurality of sensors, can be encoded to generate encoded data.

At block 583, the encoded second data can be decoded to generate decoded second data. Decoding can comprise utilizing a decoder of the autoencoder. The decoder can be implemented by the DLA.

At block 584, the decoded data can be processed utilizing the ANN. At block 585, an encoded output of the ANN can be transmitted to the host. The encoded output of the ANN can be received at the host. The encoded output can be decoded utilizing a different decoder of a different autoencoder. The different decoder can be implemented by the host.

The hyperparameters can include a quantity of layers, a quantity of nodes in each layer, a plurality of weights, a plurality of biases, and an activation function to the DLA. The hyperparameters can be encoded prior to being provided to a host. The hyperparameters can be encoded utilizing the encoder of the autoencoder. Receiving signaling indicative of the first data that comprises the hyperparameters can further comprise receiving encoded hyperparameters.

The encoded output of the ANN can be transmitted to the host to cause the host to decode the encoded output. The encoded output can be decoded utilizing a different decoder of a different autoencoder where the different decoder is implemented by the host. That is, a first decoder that is different from a second decoder can be implemented by the memory device while the second decoder is implemented by the host.

The encoded data can be provided via an interface that couples the host to the memory device. The interface can be, for example, a PCIe interface, among other suitable interfaces.

The encoder of the host and the decoder of the DLA can share a first plurality of hyperparameters. That is, the encoder of the host and the decoder of the DLA can share a same key. A different encoder of the DLA and the different decoder of the host share a second plurality of hyperparameters. That is the different encoder of the DLA and the different decoder of the host can also share a same key where the second plurality of hyperparameters are the same key. The first plurality of hyperparameters and the second plurality of hyperparameters are a same plurality of hyperparameters such that the encoder and the different encoder share a same key and the decoder and the different decoder share a same key.

The encoder of the host and the decoder of the DLA can share a first plurality of hyperparameters. That is, the encoder of the host and the decoder of the DLA can share a same key. A different encoder of the DLA and the different decoder of the host share a second plurality of hyperparameters. That is the different encoder of the DLA and the different decoder of the host can also share a same key where the second plurality of hyperparameters are the same key. The first plurality of hyperparameters and the second plurality of hyperparameters, however, can be different hyperparameters such that the encoder and the different encoder do not share a same key and the decoder and the different decoder do not share a same key.

In a number embodiments, encoded data can be received from a host and at a controller of a memory device. The controller can store the encoded data in an array of the memory device. The controller can control the DLA to, responsive to receiving signals from the controller, access the encoded data from the array. The encoded data can be decoded utilizing an autoencoder implemented by the DLA. The encoded data is decoded by a decoder of the autoencoder to generate decoded data. The decoder of the autoencoder is implemented as an ANN. The ANN can be implemented by the DLA. As such, a decoder and/or an encoder can be configured by configuring the DLA to executing the ANN having particularly hyperparameters. A plurality of operations can be performed on the decoded data.

The DLA can decode the encoded data utilizing the decoder comprising a first ANN. The DLA can also perform a plurality of operations on the decoded data utilizing second ANN. The first ANN can be independent from the second ANN. The first ANN can be implemented using a first firmware while the second ANN is implemented using a second firmware. DLA can further be configured to perform a plurality of operations on the decoded data to generate an output. The output can be provided to the host.

The DLA can encode the output to generate an encoded output prior to providing the output to the encoded host. A controller of the memory device can provide the encoded output to the host. The output can be encoded utilizing an encoder of a different autoencoder. The encoder of the different autoencoder can be implemented in the DLA.

In various instances, a first set of data can be encoded to generate encoded data. The first set of data can be encoded by an encoder of an autoencoder of the host. The encoder can be implemented by the host.

The encoded data can be provided from the host and to the DLA of the memory device to cause the DLA to process the encoded data utilizing the ANN. A control signal can be provided to the memory device to cause the memory device to process the encoded data. The DLA can decode the encoded data, utilizing a decoder of the autoencoder. The decoder can be implemented in the DLA. The decoder can decode the encoded data to generate a second set of data that corresponds to the first set of data. The second set of data can be processed utilizing the ANN. Utilizing an encoder, of the memory device, of a different autoencoder, an output of the ANN can be encoded to generate an encoded output. The encoded output can be stored the array of the memory device or can be provided to the host.

A number of obfuscation tags can be added to the encoded data. Adding obfuscation tags can alter the bandwidth of the traffic between a host and a memory device. The host can provide the number of obfuscation tags to the memory device to allow the memory device to identify the number of obfuscation tags. For example, the host can provide the obfuscation tags prior to providing the encoded data comprising the obfuscation tags. Providing the obfuscation tags to the memory device allows the memory device to recognize the obfuscation tags in the encoded data and to remove the obfuscation tags from the encoded data prior to decoding the encoded data.

The encoded data can be decoded utilizing the number of obfuscation tags. For example, the obfuscation tags may not be removed from the encoded data until after the data has been decoded. The DLA can further decode the encoded data utilizing the number of obfuscation tags.

The DLA can remove the number of obfuscation tags from the encoded data prior to decoding the encoded data utilizing a decoder of the memory device. The host can add bits to the first set of data prior to encoding the first set of data. The memory device can remove bits from the first set of data after decoding of the first set of data. The bits removed from the first set of data can correspond to the obfuscation tags. In various instances the host can be configured to retrieve the encoded output from the memory array and decode the encoded output utilizing a different decoder, of a different autoencoder, implemented by the host.

Figure 6:
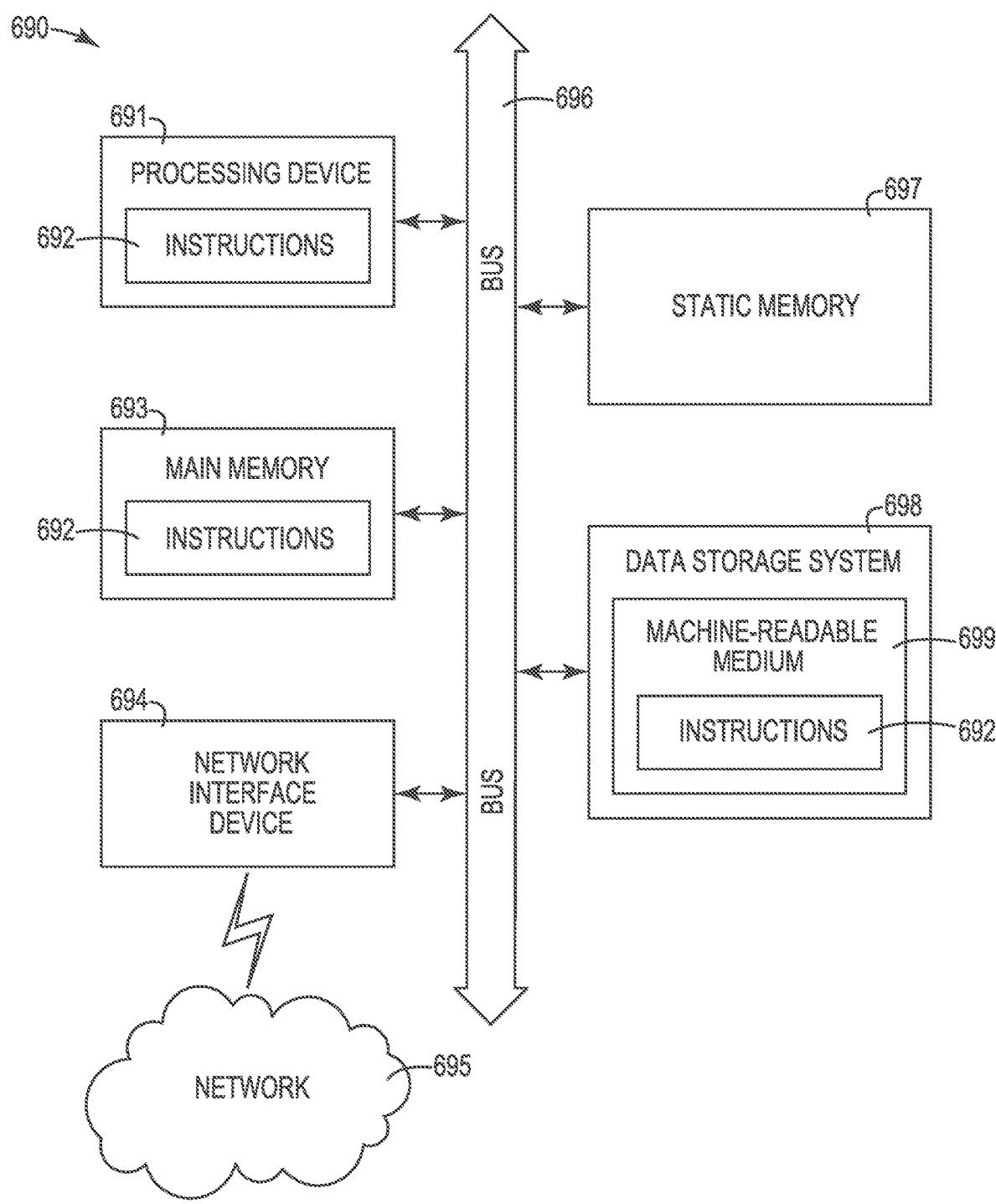
FIG. 6 illustrates an example machine of a computer system within which a set of instructions, for causing the machine to perform various methodologies discussed herein, can be executed.

FIG. 6 illustrates an example machine of a computer system 690 within which a set of instructions, for causing the machine to perform various methodologies discussed herein, can be executed. In various embodiments, the computer system 690 can correspond to a system (e.g., the computing system 100 of FIG. 1) that includes, is coupled to, or utilizes a memory sub-system (e.g., the memory device 103 of FIG. 1) or can be used to perform the operations of a controller (e.g., the controller circuitry 105 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 690 includes a processing device 691, a main memory 693 (e.g., read-only memory (ROM), flash memory, dynamic random access memory (DRAM) such as synchronous DRAM (SDRAM) or Rambus DRAM (RDRAM), etc.), a static memory 697 (e.g., flash memory, static random access memory (SRAM), etc.), and a data storage system 698, which communicate with each other via a bus 696.

Processing device 691 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 691 can also be one or more special-purpose processing devices such as an application specific integrated circuit (ASIC), a field programmable gate array (FPGA), a digital signal processor (DSP), network processor, or the like. The processing device 691 is configured to execute instructions 692 for performing the operations and steps discussed herein. The computer system 690 can further include a network interface device 694 to communicate over the network 695.

The data storage system 698 can include a machine-readable storage medium 699 (also known as a computer-readable medium) on which is stored one or more sets of instructions 692 or software embodying any one or more of the methodologies or functions described herein. The instructions 692 can also reside, completely or at least partially, within the main memory 693 and/or within the processing device 691 during execution thereof by the computer system 690, the main memory 693 and the processing device 691 also constituting machine-readable storage media.

In one embodiment, the instructions 692 include instructions to implement functionality corresponding to the host 102 and/or the memory device 103 of FIG. 1. While the machine-readable storage medium 699 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   an array of memory cells;
   a deep learning accelerator (DLA) coupled to the array; and
   a controller coupled to the array and to the DLA, wherein the controller is configured to:
      receive encoded data from a host;
      store the encoded data in the array; and
   wherein the DLA is configured to:
      responsive to receiving signals from the controller, access the encoded data from the array;
      decode the encoded data utilizing an autoencoder wherein the encoded data is decoded by a decoder of the autoencoder implemented by the DLA to generate decoded data and wherein the decoder of the autoencoder is implemented as an artificial neural network (ANN); and
      perform a plurality of operations on the decoded data.

2. The apparatus of claim 1, wherein the DLA is further configured to decode the encoded data utilizing the decoder comprising the ANN.

3. The apparatus of claim 2, wherein the DLA is further configured to perform a plurality of operations on the decoded data utilizing a second ANN.

4. The apparatus of claim 1, wherein the DLA is further configured to perform a plurality of operations on the decoded data to generate an output.

5. The apparatus of claim 4, wherein the controller is further configured to provide the output to the host.

6. The apparatus of claim 5, wherein the DLA is further configured to encode the output to generate an encoded output and wherein the controller is further configured to provide the encoded output to the host.

7. The apparatus of claim 6, wherein the DLA is further configured to encode the output utilizing an encoder of a different autoencoder, wherein the encoder is implemented in the DLA.

8. A method, comprising:
receiving, from a host at a deep learning accelerator (DLA) of a memory device, signaling indicative of first data that comprises hyperparameters to configure an artificial neural network (ANN), wherein the ANN is implemented by the DLA;
receiving encoded second data from the host at the DLA of the memory device, wherein the second data is generated by a plurality of sensors and is encoded by an encoder of an autoencoder implemented by the host;
decoding the encoded second data to generate decoded second data, wherein the decoding comprises utilizing a decoder of the autoencoder and wherein the decoder is implemented by the DLA;
processing the decoded second data utilizing the ANN; and
transmitting, to the host, an encoded output of the ANN.

9. The method of claim 8, wherein receiving signaling indicative of the first data that comprises the hyperparameters further comprises receiving the first data that comprises a quantity of layers, a quantity of nodes in each layer, a plurality of weights, a plurality of biases, and an activation function to the DLA.

10. The method of claim 8, wherein receiving signaling indicative of the first data that comprises the hyperparameters further comprises receiving encoded hyperparameters.

11. The method of claim 10, further comprising transmitting the encoded output of the ANN to the host to cause the host to decode the encoded output utilizing a different decoder of a different autoencoder implemented by the host.

12. The method of claim 8, further comprising receiving the encoded second data via an interface that couples the host to the memory device.

13. The method of claim 8, wherein the encoder of the host and the decoder of the DLA share a first plurality of hyperparameters and a different encoder of the DLA and the different decoder of the host share a second plurality of hyperparameters wherein the first plurality of hyperparameters and the second plurality of hyperparameters are a same plurality of hyperparameters.

14. The method of claim 8, wherein the encoder of the host and the decoder of the DLA share a first plurality of hyperparameters and a different encoder of the DLA and the different decoder of the host share a second plurality of hyperparameters wherein the first plurality of hyperparameters and the second plurality of hyperparameters are different.

15. A system, comprising:
a host;
a memory device comprising a deep learning accelerator (DLA) and an array of memory cells and wherein the DLA comprises a decoder of an autoencoder and an artificial neural network (ANN);
wherein the host is configured to:
encode a first set of data to generate encoded data, wherein the first set of data is encoded by an encoder of the autoencoder, wherein the encoder is implemented by the host; and
provide the encoded data from the host to the DLA of the memory device to cause the DLA to process a second set of data, corresponding to the first set of data, utilizing the ANN;
wherein the DLA is configured to:
decode the encoded data, utilizing the decoder of the autoencoder, to generate a second set of data that corresponds to the first set of data; and
process the second set of data utilizing the ANN.

16. The system of claim 15, wherein the DLA is further configured to encode, utilizing a different encoder of a different autoencoder, an output of the ANN to generate an encoded output, wherein the different encoder is implemented by the DLS.

17. The system of claim 16, further comprising a controller of the memory device configured to store the encoded output in the array of memory cells.

18. The system of claim 15, wherein the host is further configured to add a number of obfuscation tags to the encoded data.

19. The system of claim 18, wherein the host is further configured to provide the number of obfuscation tags to the memory device to allow the memory device to identify the number of obfuscation tags.

20. The system of claim 19, wherein the DLA is configured to decode the encoded data utilizing the number of obfuscation tags.

21. The system of claim 19, wherein the DLA is further configured to remove the number of obfuscation tags from the encoded data prior to decoding the encoded data utilizing the decoder of the DLA.

22. The system of claim 18, wherein the host is further configured to add bits to the first set of data prior to encoding the first set of data and wherein the memory device is further configured to remove bits from the first set of data after decoding of the first set of data.

23. The system of claim 15, wherein the host is further configured to retrieve the encoded output from the array of memory cells and decode the encoded output utilizing a different decoder, of a different autoencoder, implemented by the host.

* * * * *